UNITED STATES PATENT OFFICE.

GEORGES PICARD, OF BUENOS AIRES, ARGENTINA.

METHOD OF PRODUCING TEXTILE FIBERS FROM FLAX, HEMP, AND THE LIKE.

995,561.
No Drawing.

Specification of Letters Patent. Patented June 20, 1911.
Application filed April 14, 1909. Serial No. 489,928.

*To all whom it may concern:*

Be it known that I, GEORGES PICARD, of French nationality, resident of Buenos Aires, Argentina, have invented a new and useful Method of Producing Textile Fibers from Flax, Hemp, and the Like, of which the following is a specification.

Heretofore it has been the aim to produce textile fibers from flax, hemp and similar plants in the length of the whole stalks. It was usual to soak the stalks in water for a considerable length of time, thus allowing the outer layers of gum, resin and the like surrounding the stem to rot and the outer bark to become brittle. This rotting process, being completed the stalks are beaten by special means, to disintegrate the outer bark and also partly to loosen it from the textile fibers within. The latter are finally freed from the bark or peel by means of heckles and thus the clean fibers ready for spinning purposes are gained. This process is complicated and requires much time and is even very costly on account of the considerable hand-labor.

According to the present invention the rotting, breaking and hatching is done away with. It has been found out that the textile fibers need not have the natural length of the stalks to make them adapted to be spun. The same object is attained, when the fibers retain only a certain length say that of raw cotton. For this reason the stalks according to the present invention are freed of leaves and seeds and highly dried whereupon they are cut to short pieces and brought into a suitable machine, which completely disintegrates the outer bark and loosens the same from the stalk ends, while the surrounding layer of gum and resin falls to powder. The product thus gained is more or less mingled with impurities similar to raw cotton.

To treat the stalks of plants in the aforesaid manner divers opening-, beating-, disintegrating-, willowing- or tearing-machines and so on may be employed, used for reducing rags in the manufacture of tow, oakum and the like. If desired the stalks may be brought into the said machines uncut and to allow them to be worked up into a product like carded tow which if necessary may be cut up to acquire the state of raw cotton. The product gained in one way, or the other is now fed into cleansing machines such for instance which are used for cleaning cotton, to deprive the same from adhering leaves, husks and the like. Splitting machines, fulling- or planking-machines or Crighton-machines may be used for this purpose and these machines may be provided with means for combing and parallelizing the textile fibers, so that these are obtained in a condition ready for spinning or roving. The machine for disbarking or scaling the fibers may also be suitably combined with machines for separating the bark from the fibers. Should during the process the fibers partly become very short, these short fibers may be drawn away by means of a blower and used up for making paper-pulp.

I claim:

The method of producing textile fibers from flax, hemp and the like, which comprises freeing the stalks from leaves and seeds, highly drying the freed stalks, disintegrating the dried bark to loosen it from the stalk and permit the separation of the dried gum and resin therefrom, reducing the stalk to a carded tow product, cutting the product into small pieces, cleaning and combing the small pieces and subjecting the cut product, during the cleaning and combing, to an air blast to remove the very short particles.

GEORGES PICARD.

Witnesses:
 EDMUND HOFFMANN,
 HARRY ROECKNER.

Copies of this patent may be obtained for five cents each, by addressing the "Commissioner of Patents, Washington, D. C."